(12) United States Patent
Mikuriya et al.

(10) Patent No.: US 11,670,174 B2
(45) Date of Patent: Jun. 6, 2023

(54) RESERVED VEHICLE CONTROL METHOD, RESERVED VEHICLE CONTROL DEVICE, AND RESERVED VEHICLE CONTROL SYSTEM

(71) Applicants: Nissan Motor Co., Ltd., Kanagawa (JP); RENAULT S.A.S., Boulogne-Billancourt (FR)

(72) Inventors: Yutaka Mikuriya, Kanagawa (JP); Eijo Iwasaki, Kanagawa (JP); Takashi Hashimoto, Kanagawa (JP)

(73) Assignees: Nissan Motor Co., Ltd., Kanagawa (JP); RENAULT S.A.S., Boulogne-Billancourt (FR)

( * ) Notice: Subject to any disclaimer, the term of this patent is extended or adjusted under 35 U.S.C. 154(b) by 0 days.

(21) Appl. No.: 17/277,574

(22) PCT Filed: Sep. 21, 2018

(86) PCT No.: PCT/IB2018/001175
§ 371 (c)(1),
(2) Date: Mar. 18, 2021

(87) PCT Pub. No.: WO2020/058738
PCT Pub. Date: Mar. 26, 2020

(65) Prior Publication Data
US 2022/0036736 A1 Feb. 3, 2022

(51) Int. Cl.
*G08G 1/00* (2006.01)
*G08G 1/09* (2006.01)

(52) U.S. Cl.
CPC ............... *G08G 1/205* (2013.01); *G08G 1/09* (2013.01)

(58) Field of Classification Search
None
See application file for complete search history.

(56) References Cited

U.S. PATENT DOCUMENTS

| | | | |
|---|---|---|---|
| 9,494,938 B1 | 11/2016 | Kemler et al. | |
| 10,005,458 B2 | 6/2018 | Ohshima | |
| 10,059,255 B1 * | 8/2018 | Schreiber | G08G 1/005 |
| 10,384,597 B1 * | 8/2019 | Kemler | G01C 21/3438 |
| 10,625,734 B2 | 4/2020 | Ohshima | |

(Continued)

FOREIGN PATENT DOCUMENTS

| | | |
|---|---|---|
| JP | 200367884 A | 3/2003 |
| JP | 201622922 A | 2/2016 |

(Continued)

*Primary Examiner* — Muhammad Adnan
(74) *Attorney, Agent, or Firm* — Osha Bergman Watanabe & Burton LLP (57) ABSTRACT

A reserved vehicle control method includes a step of acquiring positional information of a terminal device, a step of acquiring positional information of a reserved vehicle, a step of determining whether a distance between the terminal device and the reserved vehicle is a predetermined value or less, in accordance with the positional information of the terminal device and the positional information of the reserved vehicle, and a step of outputting, to the terminal device, allowing information indicating that an operation on a light-emitting device mounted on the reserved vehicle is allowed, when determining that the distance between the terminal device and the reserved vehicle is the predetermined value or less.

8 Claims, 10 Drawing Sheets

(56) References Cited

U.S. PATENT DOCUMENTS

| | | | |
|---|---|---|---|
| 10,821,887 B1* | 11/2020 | Kemler | G05D 1/0022 |
| 2004/0093280 A1* | 5/2004 | Yamaguchi | G07B 13/04 |
| | | | 705/26.1 |
| 2016/0027307 A1* | 1/2016 | Abhyanker | G06Q 50/01 |
| | | | 701/117 |
| 2017/0038948 A1* | 2/2017 | Cun | G06F 3/017 |
| 2017/0123421 A1 | 5/2017 | Kentley et al. | |
| 2017/0178269 A1* | 6/2017 | McKinnon | G06Q 50/30 |
| 2017/0262802 A1* | 9/2017 | Swanson | H04W 4/029 |
| 2018/0191863 A1* | 7/2018 | Matthiesen | H04L 67/327 |
| 2019/0375372 A1 | 12/2019 | Sanji et al. | |
| 2020/0025585 A1* | 1/2020 | Hilgers | G01C 21/362 |
| 2020/0282895 A1* | 9/2020 | Yi | B60Q 1/50 |
| 2021/0125425 A1* | 4/2021 | Sussna | G06Q 10/20 |

FOREIGN PATENT DOCUMENTS

| | | |
|---|---|---|
| JP | 201699953 A | 5/2016 |
| JP | 2018111929 A | 7/2018 |
| JP | 2018129697 A | 8/2018 |
| JP | 2018141771 A | 9/2018 |

\* cited by examiner

RESERVED VEHICLE CONTROL METHOD, RESERVED VEHICLE CONTROL DEVICE, AND RESERVED VEHICLE CONTROL SYSTEM

TECHNICAL FIELD

The present invention relates to a reserved vehicle control method, a reserved vehicle control device, and a reserved vehicle control system.

BACKGROUND ART

Methods are known that identify an autonomous vehicle that a user has reserved (Patent Document 1). The invention disclosed in Patent Document 1 causes a display installed on a door of the autonomous vehicle and a smartphone that the user uses to simultaneously display the same figure. The user compares to determine whether the figure displayed on the smartphone is the same as the figure displayed on the display on the door, so as to identify the reserved autonomous vehicle.

CITATION LIST

Patent Literature

Patent Document 1: U.S. Pat. No. 9,494,938

SUMMARY OF INVENTION

Technical Problem

The invention disclosed in Patent Document 1 requires the user to compare to determine whether the figure displayed on the smartphone is the same as the figure displayed on the display on the door, since a server sets the figure to be displayed. This impedes the user's intuitive recognition in identifying the reserved autonomous vehicle.

In view of the foregoing problem, the present invention provides a reserved vehicle control method, a reserved vehicle control device, and a reserved vehicle control system enabling a user to intuitively identify a reserved autonomous vehicle.

Technical Solution

A reserved vehicle control method according to an aspect of the present invention includes a step of acquiring positional information of a terminal device, a step of acquiring positional information of a reserved vehicle, a step of determining whether a distance between the terminal device and the reserved vehicle is a predetermined value or less, in accordance with the positional information of the terminal device and the positional information of the reserved vehicle, and a step of outputting, to the terminal device, allowing information indicating that an operation on a light-emitting device mounted on the reserved vehicle is allowed, when determining that the distance between the terminal device and the reserved vehicle is the predetermined value or less.

Advantageous Effects

The present invention can enable a user to intuitively identify a reserved autonomous vehicle.

DESCRIPTION OF EMBODIMENTS

One or more embodiments of the present invention will be described below with reference to the drawings. The same elements illustrated in the descriptions of the drawings are indicated by the same reference numerals, and overlapping explanations are not made below.

(Configuration of Reserved Vehicle Control System)

Figure 1:
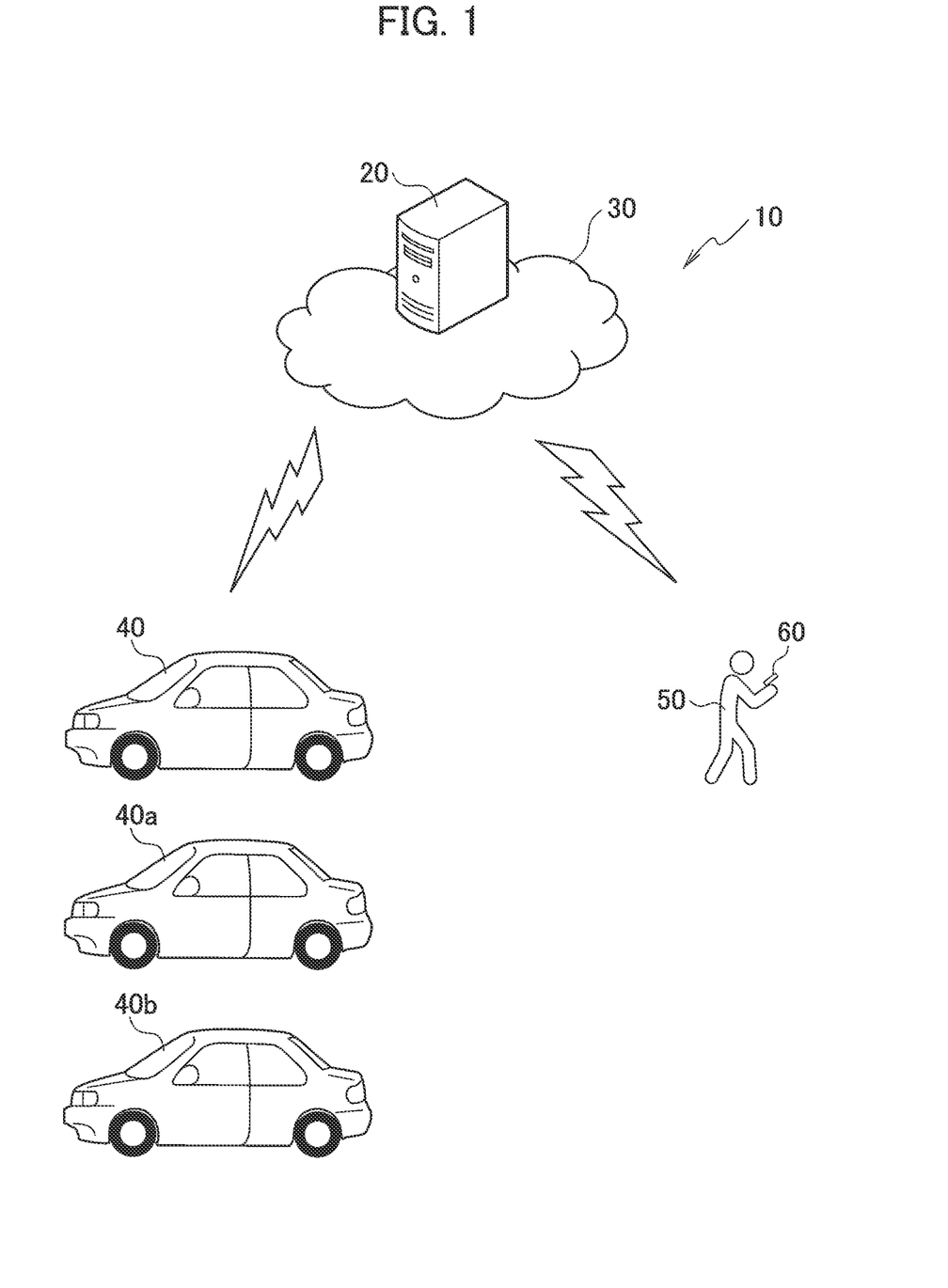
FIG. 1 is a schematic diagram illustrating a reserved vehicle identifying system according to an embodiment of the present invention.

A configuration of a reserved vehicle control system 10 is described below with reference to FIG. 1. As shown in FIG. 1, the reserved vehicle control system 10 includes a computer 20, a communication network 30, vehicles 40, 40*a*, and 40*b*, a user 50, and a terminal device 60 that the user 50 possesses. FIG. 1 illustrates the three vehicles, but the number of the vehicles is not limited to this case. The reserved vehicle control system 10 may include four or more vehicles. The reserved vehicle control system 10 may include only a single vehicle.

The computer 20 (a reserved vehicle control device) communicates with the vehicles 40, 40*a*, and 40*b* and the terminal device 60 via the communication network 30. The computer 20 is a general-purpose computer, for example, and includes a processor including a CPU and a memory such as a read-only memory (ROM) and a random-access memory (RAM). The CPU reads out a program stored in the ROM and the like to the RAM to execute the program, Part of (or all of) the reserved vehicle control system 10 including the functions of the computer 20 described below may be implemented by an application (such as software as a service (SaaS)) set in the communication network 30. The computer 20 may also be a server.

The communication network 30 may be configured in either a wireless manner or a wired manner, or in both wireless and wired manners, or may include the Internet. According to the present embodiment, the computer 20, the vehicles 40, 40a, and 40b, and the terminal device 60 are connected to the communication network 30 in wireless communications.

The vehicles 40, 40a, and 40b have autonomous driving functions. The autonomous driving according to the present embodiment refers to a state presumed that a system installed in the respective vehicles 40, 40a, and 40b executes all operations regarding driving. The vehicles 40, 40a, and 40b thus do not require a driver to get therein. Namely, the vehicles 40, 40a, and 40b can drive autonomously with no occupants. A driver, of course, can get in the respective vehicles 40, 40a, and 40b, The autonomous driving according to the present embodiment is at Level 4 or higher. The vehicles 40, 40a, and 40b are not required to be equipped with autonomous driving functions.

The user 50 uses the terminal device 60 to reserve the vehicle 40 from a plurality of vehicles (the vehicles 40, 40a, and 40b). The vehicle 40 is referred to as a reserved vehicle. The computer 20 receives the information on the reservation from the terminal device 60. The computer 20 sends, to the vehicle 40, a location at which the user 50 is to get on the vehicle 40 (referred to below as a "riding location") and a traveling route to the riding location, in accordance with the reservation information. The computer 20 further sends, to the vehicle 40, a destination of the user 50 and a traveling route to the destination in accordance with the reservation information. The vehicle 40 autonomously travels to the riding location in accordance with the information acquired from the computer 20. The vehicle 40 allows the user 50 to get in at the riding location to transport the user 50 to the destination. The vehicle 40 then autonomously travels back to a predetermined standby point. According to the present embodiment, a user ID for identifying the user 50 is linked with a vehicle ID for identifying the vehicle 40 by the computer 20. The terminal device 60 is a device that the user 50 can carry around, and can be a smartphone or a tablet, for example. The user ID as used herein is thus an ID allotted to the terminal device 60.

Next, the computer 20, the vehicle 40, and the terminal device 60 are described in detail below with reference to FIG. 2.

Figure 2:
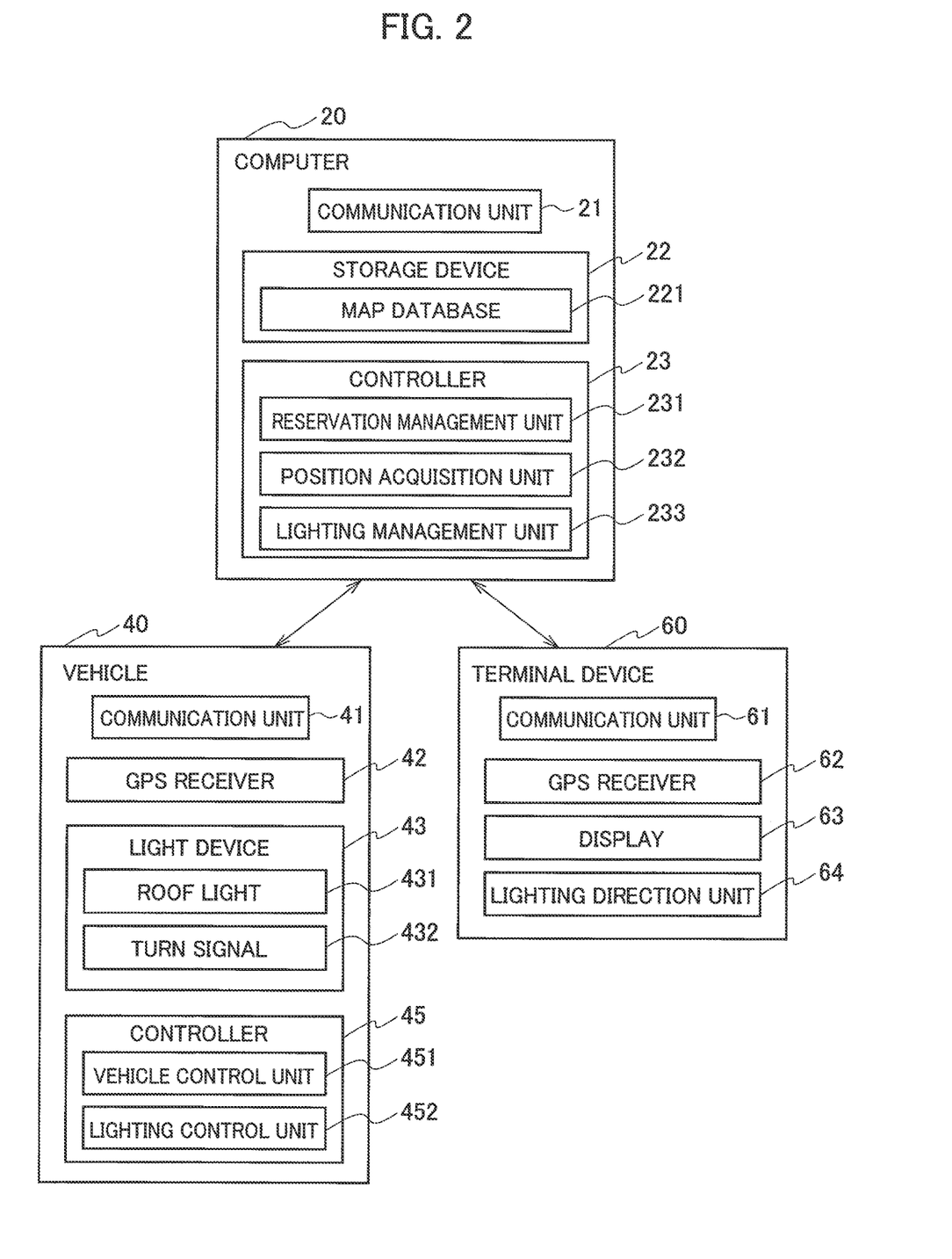
FIG. 2 is a schematic configuration diagram illustrating the reserved vehicle identifying system according to the embodiment of the present invention.

As shown in FIG. 2, the computer 20 includes a communication unit 21, a storage device 22, and a controller 23. The vehicle 40 includes a GPS receiver 42, a light device 43, and a controller 45. The terminal device 60 includes a communication unit 61, a GPS receiver 62, a display 63, and a lighting direction part 64.

The communication unit 21, the communication unit 41, and the communication unit 61 are each an interface connected to the communication network 30 to send and receive data. According to the present embodiment, the communication between the vehicle 40 and the terminal device 60 is made via the computer 20. The vehicle 40 and the terminal device 60 do not directly communicate with each other.

The storage device 22 includes single or plural random-access memories (RAMS) serving as accessible storage devices. A map database 221 is stored in the storage device 22. The map database 221 includes various kinds of data necessary for a route guidance such as road information and facility information. The map database 221 also includes other information on roads, such as the number of lanes, road boundaries (such as white lines and road defining lines), landmarks, and curbs.

The controller 23 (a control unit) functions as a plurality of information processing circuits. While the present embodiment is illustrated with a case in which the software is installed to fabricate the respective information processing circuits included in the computer 20, dedicated hardware for executing each information processing as described below can be prepared to fabricate the information processing circuits. The respective information processing circuits may be implemented by individual hardware. The controller 23 includes a reservation management unit 231, a position acquisition unit 232, and a lighting management unit 233, as the information processing circuits.

The reservation management unit 231 manages the reservation information acquired from the user 50. The position acquisition unit 232 acquires positional information of the vehicle 40 from the vehicle 40 (the communication unit 41). The position acquisition unit 232 also acquires positional information of the terminal device 60 from the terminal device 60 (the communication unit 61).

The lighting management unit 233 outputs, to the terminal device 60, allowing information indicating that the operation on the light device 43 is allowed. The specific explanations are made below.

The GPS receiver 42 receives radio waves from satellites so as to detect the position (such as a longitude and a latitude) of the vehicle 40 on the ground. Similarly, the GPS receiver 62 receives radio waves from satellites so as to detect the position (such as a longitude and a latitude) of the terminal device 60 on the ground.

The light device 43 is a device mounted on the vehicle 40 to notify drivers on other vehicles or pedestrians of the information (the position, the braking, and the traveling direction) of the vehicle 40. The light device 43 includes roof lights 431 and turn signals 432, for example. The light device 43 illustrated is an example, and is only required to be a light-emitting device that is mounted on the vehicle and emits light visually recognized by people present around the vehicle 40.

Figure 3:
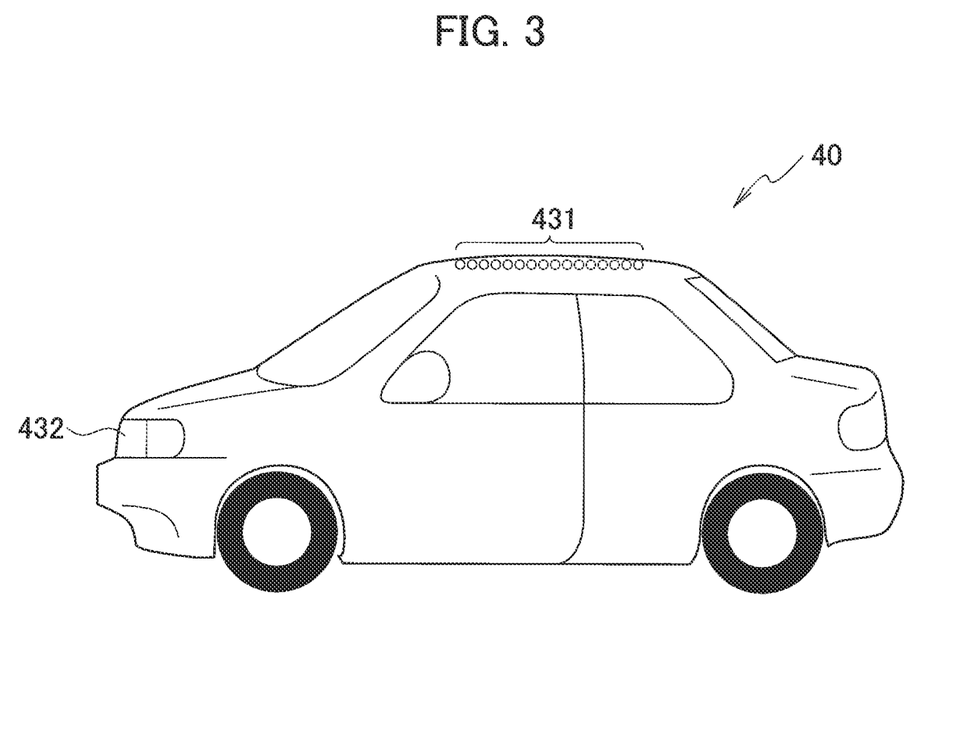
FIG. 3 is a diagram for explaining, a light device according to the embodiment of the present invention.

The roof lights 432 are installed along the edges of the roof (the edges on the four sides) of the vehicle 40, as illustrated in FIG. 3. The roof lights 431 include, for example, but not necessarily, a plurality of light-emitting diodes (LEDs).

The turn signals 432 are installed in the vehicle 40 on the right and left sides, as illustrated in FIG. 3. The turn signals 432 indicate the traveling direction of the vehicle 40 by blinking.

The controller 45 functions as a plurality of information processing circuits, as in the case of the controller 23. The controller 45 includes a vehicle control unit 451 and a lighting control unit 452 as the information processing circuits.

The vehicle control unit 451 controls the vehicle 40 by means of known techniques. In particular, the vehicle control unit 451 controls a brake actuator, an accelerator actuator, and a steeling actuator, for example, in accordance with pieces of information acquired by various kinds of sensors (such as a camera and a laser rangefinder) mounted on the vehicle 40. The control by the vehicle control unit 451 enables the autonomous driving.

The lighting control unit 452 turns on or turns off the light device 43 in accordance with signals received from the computer 20.

An example of operation of the reserved vehicle control system 10 is described below with reference to FIG. 4 to FIG. 8.

Figure 4:
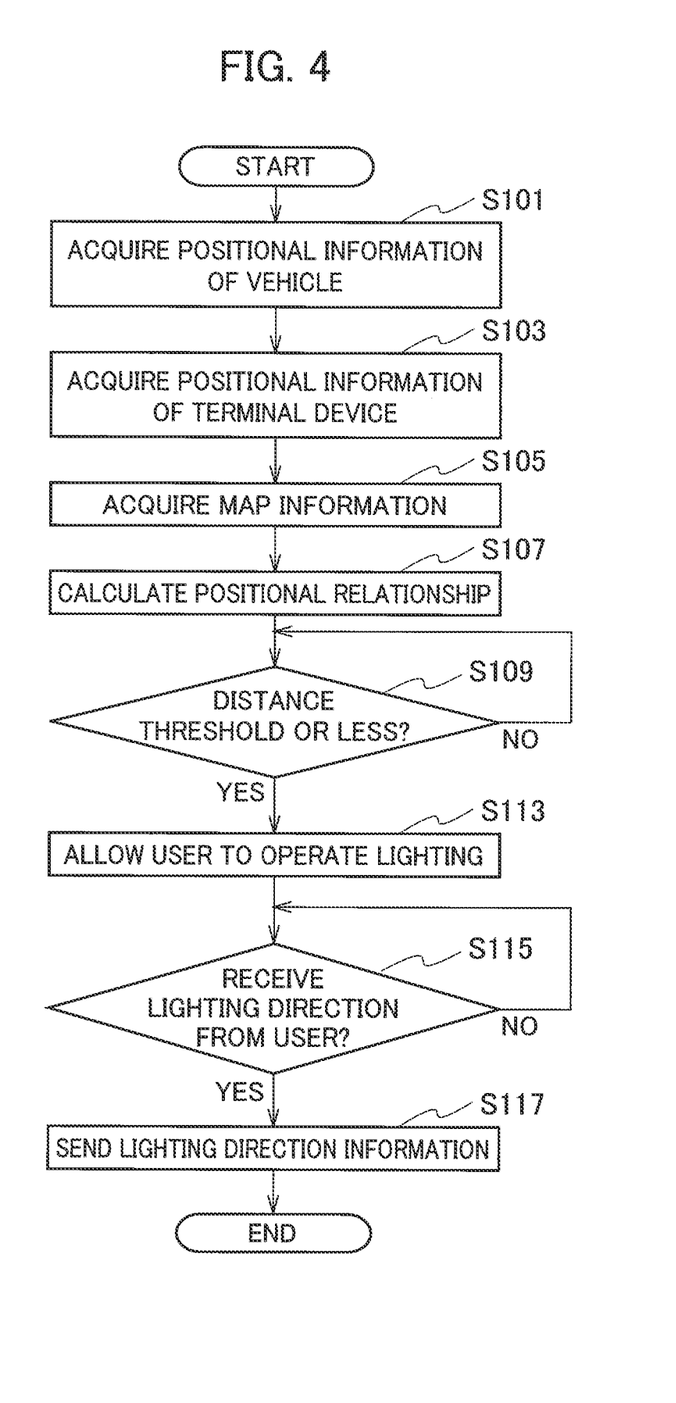
FIG. 4 is a flowchart illustrating an example of operation of a computer according to the embodiment of the present invention.

First, an example of operation of the computer 20 is described below with reference to FIG. 4. The following case is described on the assumption that the user 50 has reserved the vehicle 40, and the computer 20 receives the information on the reservation from the terminal device 60. The computer 20 sends, to the vehicle 40, a riding location at which the user 50 is to get on and a traveling route to the riding location in accordance with the reservation information. The vehicle 40 autonomously travels toward the riding location acquired from the computer 20.

In step S101, the position acquisition unit 232 acquires the positional information of the vehicle 40 from the UPS receiver 42. The process proceeds to step S103, and the position acquisition unit 232 acquires the positional information of the terminal device 60 from the UPS receiver 62.

The process proceeds to step S105, and the position acquisition unit 232 acquires the map information from the map database 221. The process proceeds to step S107, and the position acquisition unit 232 determines whether the distance between the terminal device 60 and the vehicle 40 is a predetermined value or less in accordance with the positional information of the terminal device 60 and the positional information of the vehicle 40. When the distance between the terminal device 60 and the vehicle 40 is the predetermined value or less (Yes in step S109), the process proceeds to step S113. When the distance between the terminal device 60 and the vehicle 40 is greater than the predetermined value (No in step S109), the process is on standby.

Figure 5:
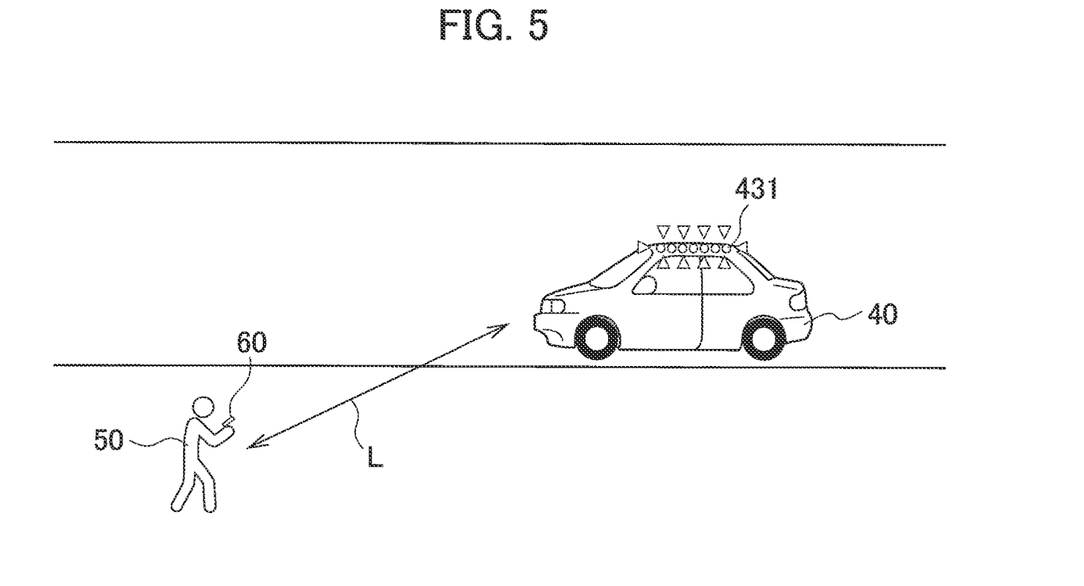
FIG. 5 is a diagram for explaining an example of lighting of the light device in one example.

The distance L illustrated in FIG. 5 is a distance between the terminal device 60 and the vehicle 40. The distance between the terminal device 60 and the vehicle 40 determined to be the predetermined value or less herein refers to a case in which the distance L illustrated in FIG. 5 is in a range of 10 meters to 30 meters, for example. The situation illustrated in FIG. 5 indicates that the process in step S109 in FIG. 4 is determined to be YES.

Figure 6:
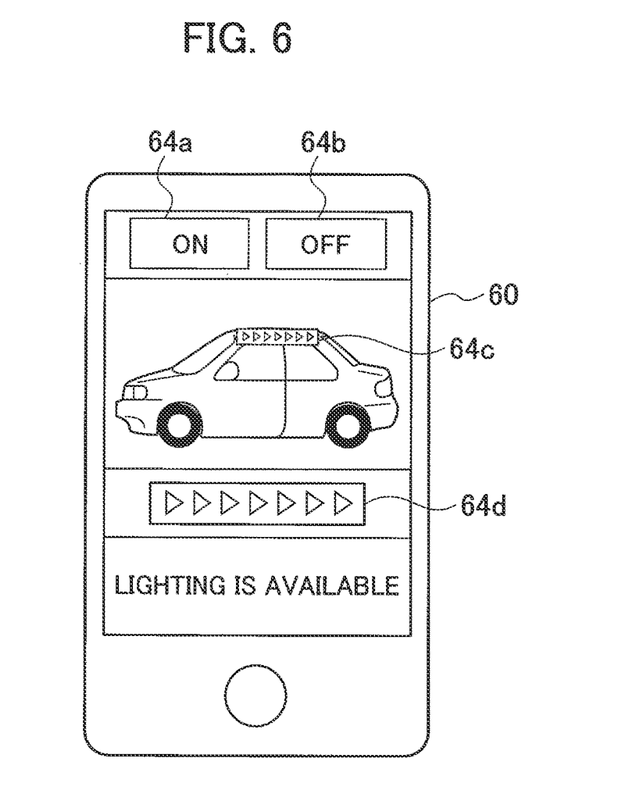
FIG. 6 is a diagram for explaining allowing information output to a terminal device in one example.

When the process in step S109 is determined to be YES, the process then proceeds to step S113, and the lighting management unit 233 outputs, to the terminal device 60, the allowing information indicating that the operation on the light device 43 is allowed. When outputting the allowing information, the lighting management unit 233 may send, to the terminal device 60, a signal for causing the display 63 to display the allowing information. Alternatively, the lighting management unit 233 may control an application preliminarily installed in the terminal device 60 to cause the display 63 to display the allowing information. FIG. 6 illustrates an example of the allowing information displayed on the display 63. As illustrated in FIG. 6, the allowing information includes the lighting direction part 64 (64a to 64d). The user 50 operates the respective lighting direction parts 63a to 64d to give the direction to turn on the light device 43 (Yes in step S115).

The operation by the user 50 includes an operation of tapping the display 63 (a touch panel) and an operation of swiping the display 63. When the user 50 operates the lighting direction part 64a, the terminal device 60 sends, to the lighting management unit 233, a signal indicating that the user 50 has operated the lighting direction part 64a. In other words, the lighting management unit 233 receives response information indicating that the user 50 has responded to the allowing information input to the terminal device 60. The lighting management unit 233 sends, to the vehicle 40 (the lighting control unit 452), the lighting direction information indicating the direction for turning on the light device 43, in accordance with the response information (in step S117). As illustrated in FIG. 5, the lighting control unit 452, when receiving the lighting direction information, causes the light device 43 (the roof lights 431) to be turned on. Since the operation (the direction) by the user 50 causes the roof lights 431 to be turned on, the user 50 can intuitively identify the vehicle 40 as the one that he/she has reserved.

The same processing is executed when the user 50 swipes the lighting direction part 64c or 64d. When the user 50 operates the lighting direction part 64b, the roof lights 431 are turned off. When the user 50 makes no action (direction) in step 115, the process is on standby. The color used for the lighting of the roof lights 431 is set on the computer 20 side. The user 50 cannot set the color for the lighting of the roof lights 431. The reason for this is that, if the user 50 sets the color for the lighting of the roof lights 431, the color set by the user 50 could conform to the color set by other users. This impedes the identification of the reserved vehicle (the vehicle 40). The computer 20 thus sets the color so as not to conform to the color set by other adjacent users. The color of the roof lights of the vehicle icon indicated in FIG. 6 and the color of the roof lights 431 when actually turned on are set to be the same. According to the present embodiment, since the operation (the direction) by the user 50 causes the roof lights 431 to be turned on with the same color as the color displayed on the display 63, the user 50 can intuitively identify the vehicle 40 as the one that he/she has reserved.

Figure 7:
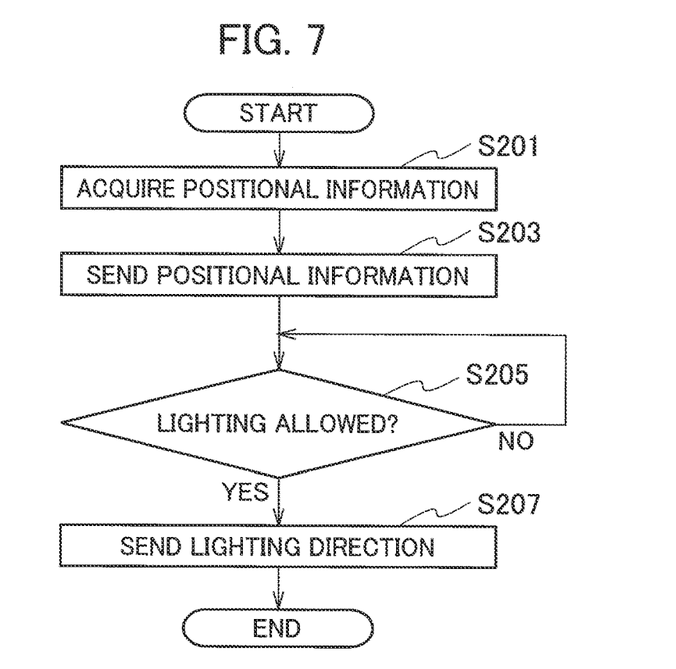
FIG. 7 is a flowchart illustrating an example of operation of the terminal device according to the embodiment of the present invention.

Next, an example of operation of the terminal device 60 is described below with reference to FIG. 7.

In step S201, the UPS receiver 62 detects the position of the terminal device 60. The process proceeds to step S203, and the terminal device 60 (the communication unit 61) sends the positional information of the terminal device 60 to the computer 20. The process proceeds to step S205, and the terminal device 60, when receiving the allowing information from the lighting management unit 233 (Yes in step S205), receives the operation performed by the user 50). When the user 50 operates the lighting direction part 64, the terminal device 60 sends, to the lighting management unit 233, the signal indicating that the user 50 has operated the lighting direction part 64 (in step S207). When the terminal device 60 does not receive the allowing information from the lighting management unit 233 (No in step S205), the process is on standby.

Figure 8:
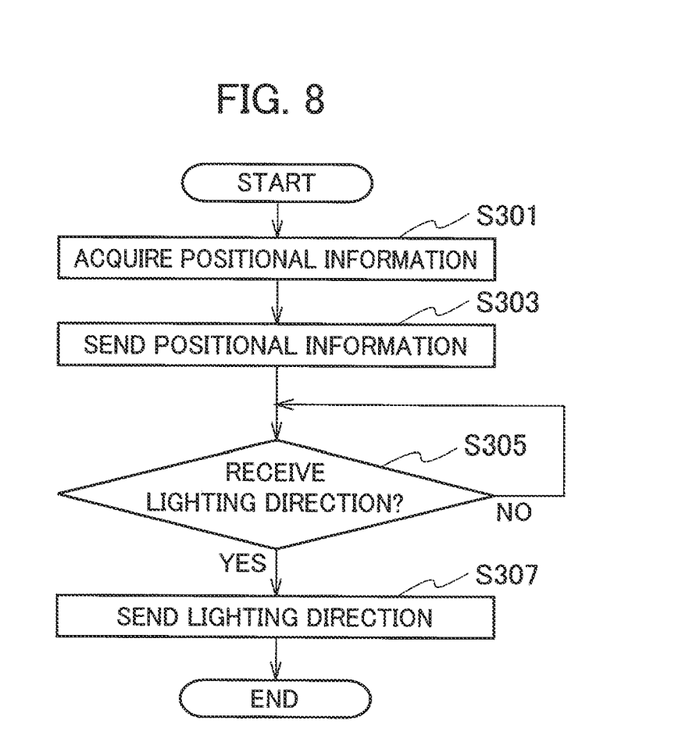
FIG. 8 is a flowchart illustrating an example of operation of a vehicle according to the embodiment of the present invention.

Next, an example of operation of the vehicle 40 is described below with reference to FIG. 8.

In step S301, the UPS receiver 42 detects the position of the vehicle 40. The process proceeds to step S303, and the vehicle 40 (the communication unit 41) sends the positional information of the vehicle 40 to the computer 20. The process proceeds to step S305, and the lighting control unit 452, when receiving the lighting direction information from the lighting management unit 233 (Yes in step S305), turns on the light device 43 (the roof lights 431) (in step S307), When the lighting control unit 452 does not receive the lighting direction information from the lighting management unit 233 (No in step S305), the process is on standby.

Figure 9:
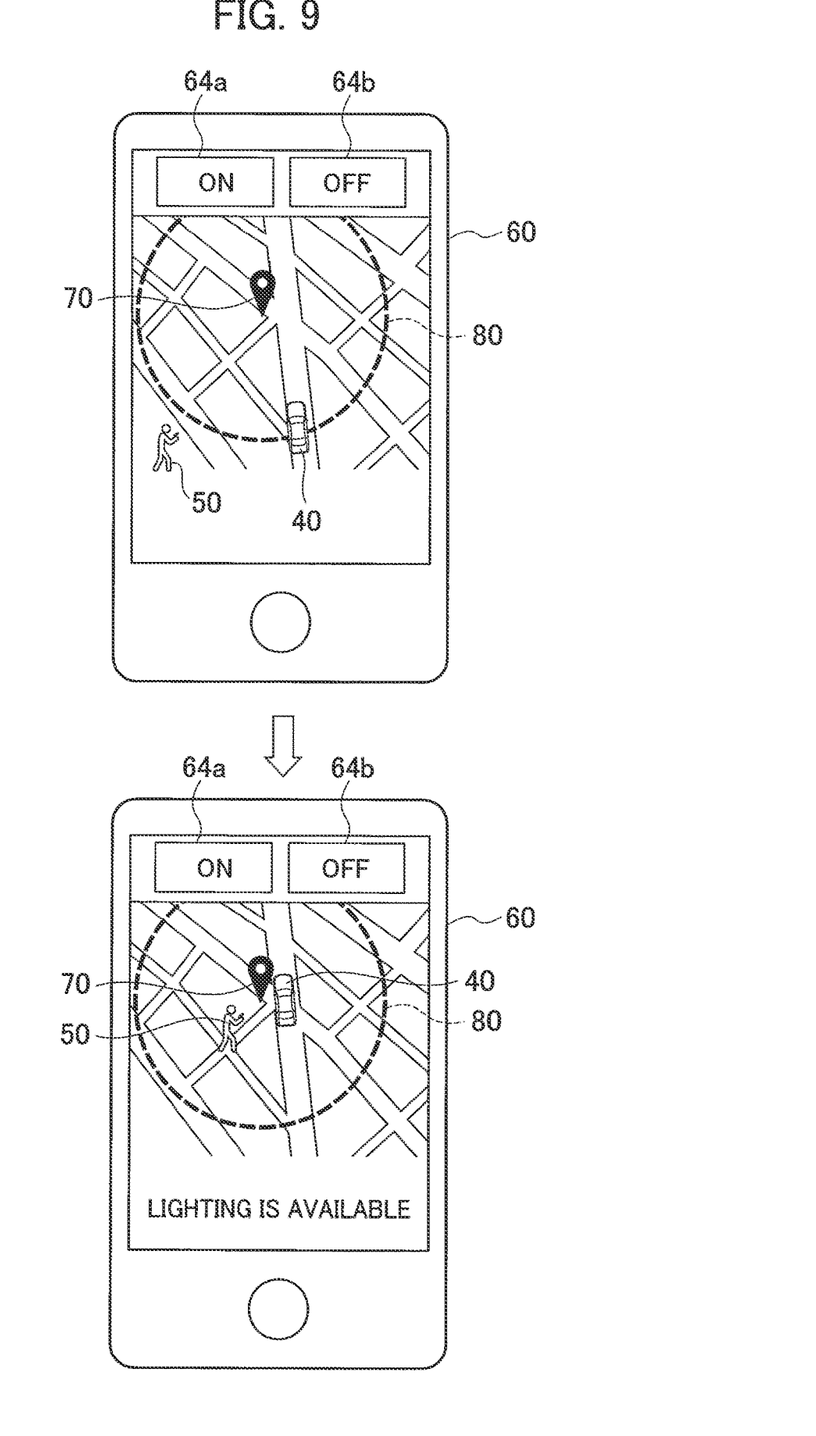
FIG. 9 is a diagram for explaining allowing information output to the terminal device in one example.
Figure 10:
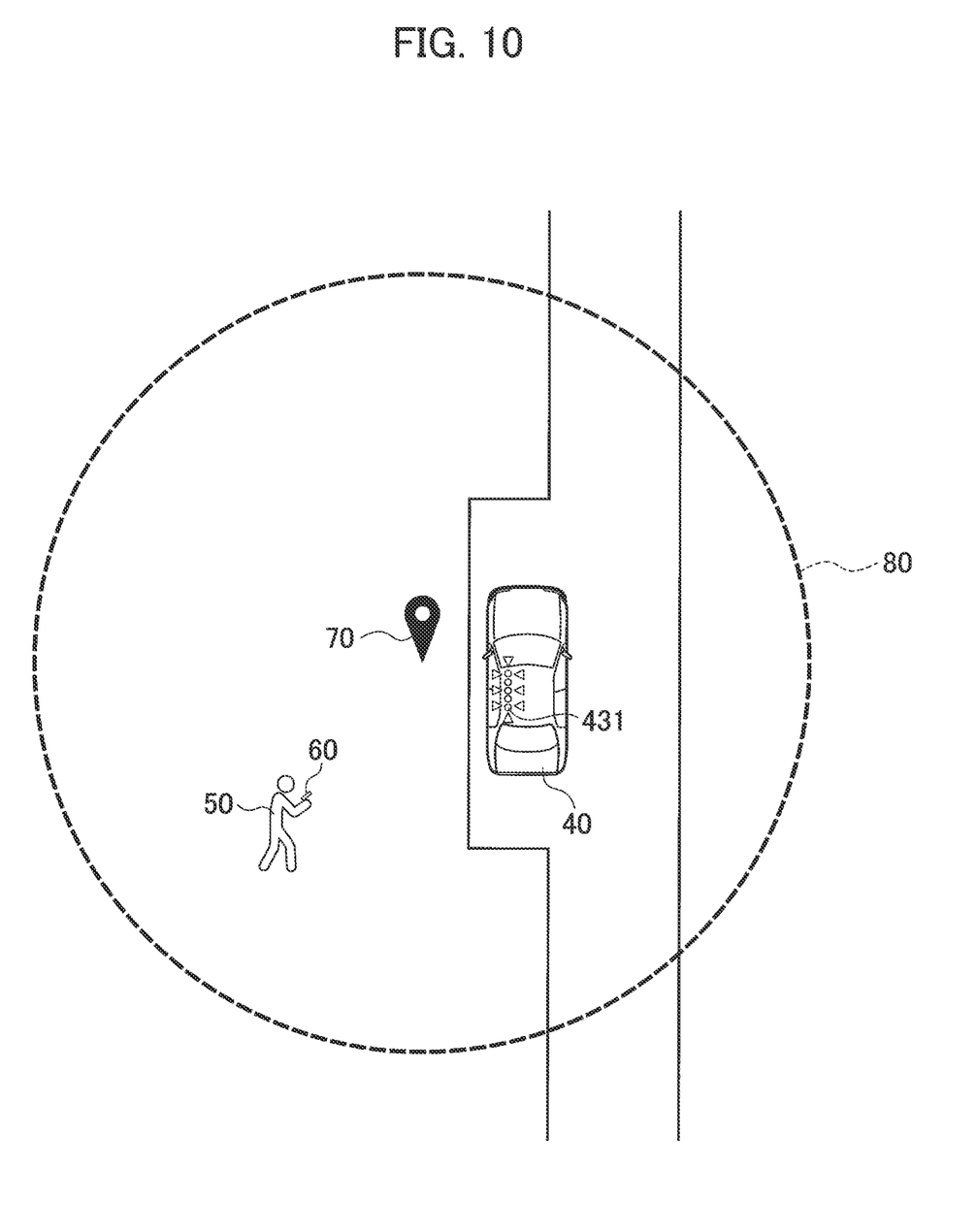
FIG. 10 is a partly enlarged diagram of FIG. 9.

As illustrated in FIG. 9, when the terminal device 60 and the vehicle 40 are located within a predetermined range around the riding location 70, the lighting management unit 233 may output the allowing information to the terminal device 60. The riding location 70 is a location at which the user 50 is to get on the vehicle 40, as illustrated in FIG. 10, and is a stopping place or a parking place, for example. The riding location 70 is set at the reservation timing. As illustrated in FIG. 9, the position of the riding location 70, the position of the user 50 (the position of the terminal device 60), and the position of the vehicle 40 are displayed on the terminal device 60. Reference numeral 80 shown in FIG. 9 indicates the predetermined range around the riding location 70. The shape of the predetermined range is circular, for example. The predetermined range 80 may be either displayed on the terminal device 60 or not. As illustrated in FIG. 9, when the user 50 and the vehicle 40 are coming close to the riding location 70, and the terminal device 60 and the vehicle 40 are thus present within the predetermined range 80, the lighting management unit 233 may output the allowing information to the terminal device 60. The user 50, when recognizing the allowing information, operates the lighting direction part 64a so that the roof lights 431 are turned on (refer to FIG. 10). The user 50 thus can identify the vehicle 40 as the one that he/she has reserved.

Figure 11:
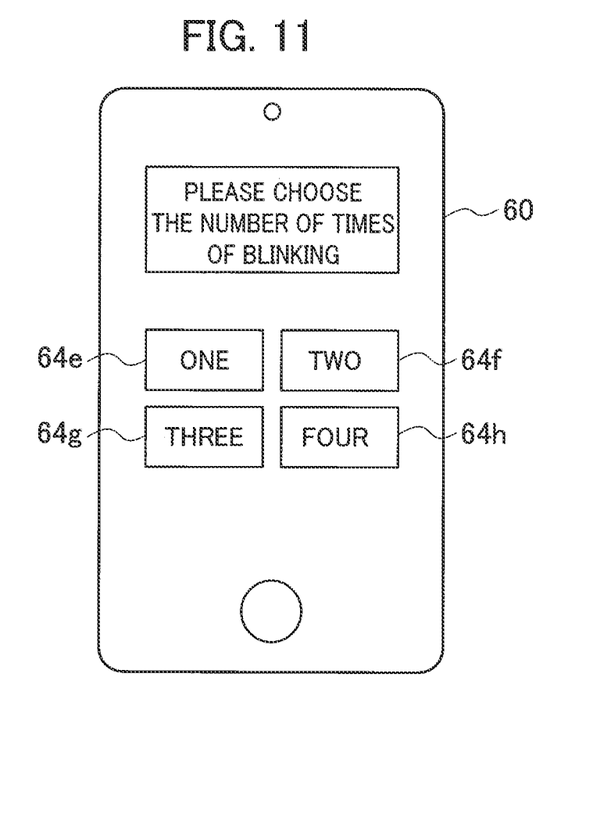
FIG. 11 is a diagram for explaining allowing information output to the terminal device in one example.
Figure 12:
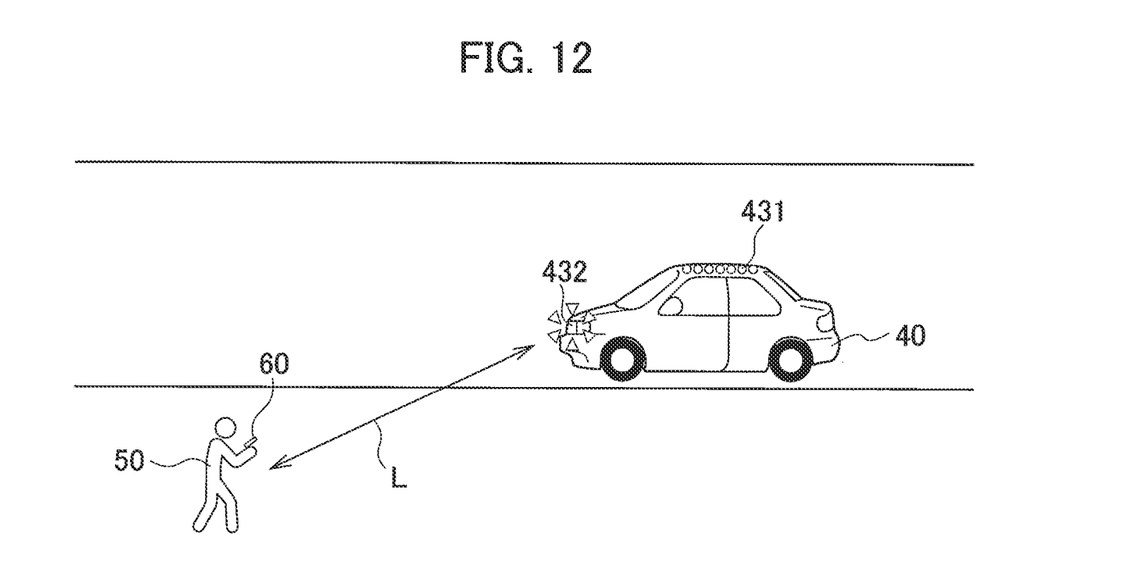
FIG. 12 is a diagram for explaining an example of lighting of the light device in one example.

While the above example is illustrated with the lighting of the roof lights 431, the target to be turned on is not limited to the roof lights 431. As illustrated in FIG. 11 and FIG. 12, the lighting control unit 452 may blink the turn signals 432.

As illustrated in FIG. 11, the lighting management unit 233 may provide the number of times of blinking of the turn signals 432 so as to be chosen by the user 50, as one example of the allowing information. When the user 50 operates the lighting direction part 64e illustrated in FIG. 11, the turn signals 432 blink one time, as illustrated in FIG. 12. Similarly, when the user 50 operates the lighting direction part 64f, the turn signals 432 blink two times. Similarly, when the user 50 operates the lighting direction part 64g, the turn signals 432 blink three times. Similarly, when the user 50 operates the lighting direction part 64h, the turn signals 432 blink four times. Since the number of times of blinking of the turn signals 432 changes depending on the choice of the user 50, the user 50 can intuitionally identify the vehicle 40 as the one that he/she has reserved.

The lighting control unit 452 may vary the turn signals 432 to be turned on depending on the position of the user 50 (the position of the terminal device 60). As illustrated in FIG. 12, the lighting control unit 452 may turn on and blink the turn signals 432 on the left side when the user 50 (the terminal device 60) is located on the front left side of the vehicle 40. Blinking the turn signals 432 at the position corresponding to the direction of the user 50 allows the user 50 to easily recognize the turn signals 432 blinking. The lighting control unit 452 may turn on one of the roof lights 431 at the position corresponding to the direction of the user 50. For example, as illustrated in FIG. 12, the lighting control unit 452 may turn on the roof light 431 mounted at the left edge of the roof of the vehicle 40.

As described above, the reserved vehicle control system 10 according to the present embodiment can achieve the following functional effects.

The computer 20 acquires the positional information of the vehicle 40 from the UPS receiver 42, and acquires the positional information of the terminal device 60 from the UPS receiver 62. The computer 20 determines whether the distance between the terminal device 60 and the vehicle 40 is the predetermined value or less in accordance with the positional information of the terminal device 60 and the positional information of the vehicle 40. When the distance between the terminal device 60 and the vehicle 40 is the predetermined value or less, the computer 20 outputs, to the terminal device 60, the allowing information indicating that the operation on the light device 43 mounted on the vehicle 40 is allowed. The computer 20 turns on the light device 43 in accordance with the response information (the operation by the user 50) input to the terminal device 60 in response to the allowing information (refer to FIG. 5). Namely, the computer 20 controls the lighting state of the light device 43 depending on the operation performed on the terminal device 60 having received the allowing information. Since the light device 43 is turned on through the operation by the user 50, the user 50 can intuitively identify the vehicle 40 as the one that he/she has reserved. Further, since there is no need to install a display on the vehicle 40, as disclosed in Patent Document 1, the present embodiment has the advantage in cost.

The computer 20, when determining that the terminal device 60 and the vehicle 40 are present within the predetermined range 80 around the location (the riding location 70) at which the user 50 is to get on the vehicle 40, may output the allowing information to the terminal device 60 (refer to FIG. 9 and FIG. 10). The user 50 thus can intuitively identify the vehicle 40 as the one that he/she has reserved.

The computer 20 may turn on the light device 43 located at the position corresponding to the direction of the user 50. This allows the user 50 to easily recognize the light device 43 being turned on.

The respective functions described in the above embodiment can be implemented in single or plural processing circuits. The respective processing circuits include a programmed processing device, such as a processing device including an electric circuit. The respective processing circuits also include an application-specific integrated circuit (ASIC) configured to execute the functions described above, and other devices such as circuit components. The reserved vehicle control system 10 can improve the functions of the computer.

While the present invention has been described above by reference to the embodiment, it should be understood that the present invention is not intended to be limited to the descriptions and the drawings composing part of this disclosure. Various alternative embodiments, examples, and technical applications will be apparent to those skilled in the art according to this disclosure.

For example, while the above embodiment has been illustrated with the case in which the computer 20 allows the user 50 to execute the operation for turning on the light device 43, the computer 20 may inhibit the user 50 from turning on the light device 43 depending on the distance between the terminal device 60 and the vehicle 40. For example, when the distance between the terminal device 60 and the vehicle 40 is much shorter than the distance L illustrated in FIG. 5, the computer 20 may inhibit the user 50 from turning on the light device 43. An example in which the distance between the terminal device 60 and the vehicle 40 is much shorter than the distance L illustrated in FIG. 5 is a case in which the user 50 has already got in the vehicle 40. In such a case, turning on the light device 43 has no meaning, since the user 50 has already identified the vehicle 40. Instead, turning on the light device 43 in such a situation wastes excessive energy. The computer 20 thus may inhibit the user 50 from executing the operation for turning on the light device 43 depending on the distance between the terminal device 60 and the vehicle 40. This can avoid excessive energy to be consumed.

The computer 20 may also turn on the light device 43 when the user 50 is present within a predetermined angle in the traveling direction of the vehicle 40.

The displaying example of the terminal device 60 is not limited to the case illustrated in FIG. 6. For example, as another displaying example, the display which is inactive before receiving the allowing information may be turned to be active after receiving the allowing information.

The computer 20 may also output, to the terminal device 60, the allowing information indicating that the operation performed on the light device 43 is allowed when the distance between the terminal device 60 and the vehicle 40 is the predetermined value or less, and when the user 50 can visually confirm the vehicle 40. This case is described below with reference to FIG. 13. The process in steps S401 to S409 and steps S413 to S417 shown in FIG. 13 is the same as the process in steps S101 to S109 and steps S113 to S117, and overlapping explanations are not repeated below.

Figure 13:
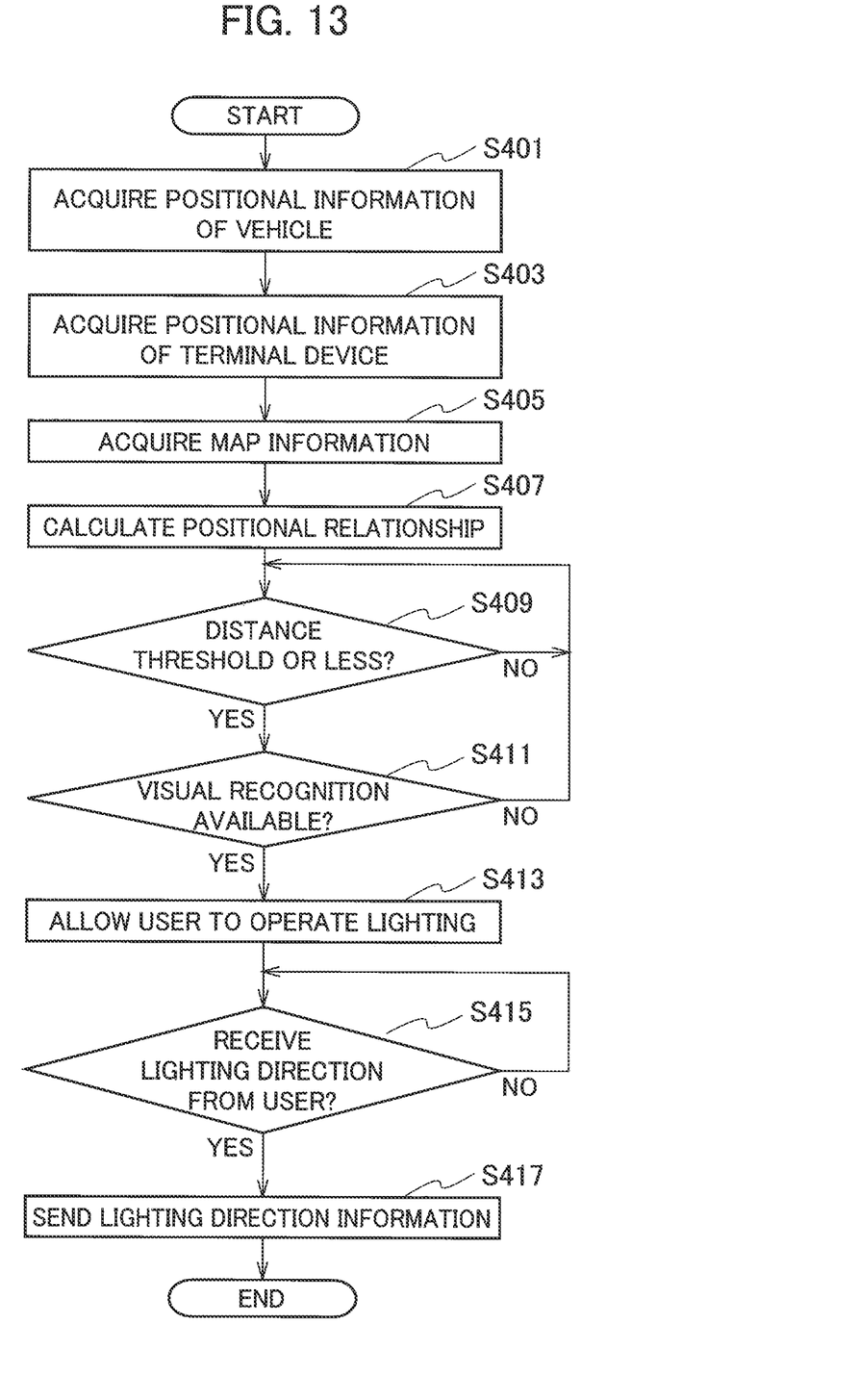
FIG. 13 is a flowchart illustrating an example of operation of a computer according to another embodiment of the present invention.

In step S411 shown in FIG. 13, the position acquisition unit 232 determines whether the user 50 can visually confirm the vehicle 40, in accordance with the map information acquired in step S405, the positional information of the terminal device 60, and the positional information of the vehicle 40. The user 50 sometimes cannot visually confirm the vehicle 40 if there is a construction (such as a large-sized building) between the terminal device 60 and the vehicle 40 although the distance between the terminal device 60 and the vehicle 40 is the predetermined value or less. The position acquisition unit 232 then determines whether there is a construction obstructing the field of vision of the user 50 between the user 50 and the vehicle 40 in accordance with the map information acquired in step S405. When there is no construction obstructing the field of vision of the user 50 between the user 50 and the vehicle 40, the controller 23 determines that the user 50 can visually confirm the vehicle 40 (Yes in step S411). When the controller 23 determines that the user 50 cannot visually confirm the vehicle 40, the process returns to step S409. The situation illustrated in FIG. 5 is the case in which the user 50 can visually confirm the vehicle 40. Since the light device 43 is turned on through the operation by the user 50 when the user 50 can visually confirm the vehicle 40, the user 50 can intuitively identify the vehicle 40 as the one that he/she has reserved.

The above example has been illustrated with the case of using the terminal device 60 when the user 50 reserves the vehicle 40 and gives the direction to turn on the light device 43, but is not limited to this case. The reservation of the vehicle 40 may be made by another terminal device instead of the terminal device 60. The CPU installed in the terminal device 60 may be substituted for the computer 20 to execute the functions of the computer 20. Alternatively, the CPU installed in the vehicle 40 may be substituted for the computer 20 to execute the functions of the computer 20.

REFERENCE SIGNS LIST

10 RESERVED VEHICLE CONTROL SYSTEM
20 COMPUTER
21, 41, 61 COMMUNICATION UNIT
22 STORAGE DEVICE
23, 45 CONTROLLER
30 COMMUNICATION NETWORK
40, 40a, 40b VEHICLE
42, 62 GPS RECEIVER
43 LIGHT DEVICE
50 USER
60 TERMINAL DEVICE
63 DISPLAY
64, 64a to 64h LIGHTING DIRECTION PART
221 MAP DATABASE
231 RESERVATION MANAGEMENT UNIT
232 POSITION ACQUISITION UNIT
233 LIGHTING MANAGEMENT UNIT
431 ROOF LIGHT
432 TURN SIGNAL
451 VEHICLE CONTROL UNIT
452 LIGHTING CONTROL UNIT

The invention claimed is:

1. A reserved vehicle control method of a reserved vehicle control device capable of communicating with a terminal device that a user possesses and a plurality of vehicles, and controlling a reserved vehicle reserved by the user from the plural vehicles through the terminal device in accordance with an operation performed on the terminal device, the method comprising:
acquiring positional information of the terminal device;
acquiring positional information of the reserved vehicle;
outputting, to the terminal device, allowing information indicating that an operation on a light-emitting device mounted on the reserved vehicle is allowed, in accordance with the positional information of the terminal device, the positional information of the reserved vehicle, and a location at which the user is to get in the reserved vehicle,
wherein the allowing information is output to the terminal device to allow the user to turn on the light-emitting device by performing an operation on the terminal device,
setting a first color for the light-emitting device that is a different color from a second color that is set by an adjacent user according to the operation performed on the terminal device, subsequent to receiving the allowing information;
acquiring map information;
determining, according to the map information, whether there is a construction obstructing a field of vision of the user between the terminal device and the reserved vehicle; and
outputting the allowing information to the terminal device when determining that there is no construction obstructing the field of vision of the user between the terminal device and the reserved vehicle.

2. A reserved vehicle control device comprising a control unit capable of communicating with a terminal device that a user possesses and a plurality of vehicles, and controlling a reserved vehicle reserved by the user from the plural vehicles through the terminal device in accordance with an operation performed on the terminal device, wherein the control unit is configured to:
acquire positional information of the terminal device;
acquire positional information of the reserved vehicle;
output, to the terminal device, allowing information indicating that an operation on a light-emitting device mounted on the reserved vehicle is allowed, in accordance with the positional information of the terminal device, the positional information of the reserved vehicle, and a location at which the user is to get in the reserved vehicle,
wherein the allowing information is output to the terminal device to allow the user to turn on the light-emitting device by performing an operation on the terminal device,
set a first color for the light-emitting device that is a different color from a second color that is set by an adjacent user according to the operation performed on the terminal device, subsequent to receiving the allowing information;
acquire map information;
determine, according to the map information, whether there is a construction obstructing a field of vision of the user between the terminal device and the reserved vehicle; and
output the allowing information to the terminal device when it is determined that there is no construction obstructing the field of vision of the user between the terminal device and the reserved vehicle.

3. A reserved vehicle control system comprising a terminal device that a user possesses, a plurality of vehicles, and a computer capable of communicating with the terminal device and the plural vehicles, the system being configured to control a reserved vehicle reserved by the user from the plural vehicles through the terminal device in accordance with an operation performed on the terminal device, wherein the computer is configured to:

acquire positional information of the terminal device;

acquire positional information of the reserved vehicle;

output, to the terminal device, allowing information indicating that an operation on a light-emitting device mounted on the reserved vehicle is allowed, in accordance with the positional information of the terminal device, the positional information of the reserved vehicle, and a location at which the user is to get in the reserved vehicle, wherein the allowing information is output to the terminal device to allow the user to turn on the light-emitting device by performing an operation on the terminal device, set a first color for the light-emitting device that is a different color from a second color that is set by an adjacent user according to the operation performed on the terminal device, subsequent to receiving the allowing information;

acquire map information;

determine, according to the map information, whether there is a construction obstructing a field of vision of the user between the terminal device and the reserved vehicle; and output the allowing information to the terminal device when it is determined that there is no construction obstructing the field of vision of the user between the terminal device and the reserved vehicle.

4. The reserved vehicle control system according to claim 3, wherein the computer controls light emission of the light-emitting device in accordance with the operation performed on the terminal device having received the allowing information.

5. The reserved vehicle control system according to claim 3, wherein the computer is configured to output the allowing information to the terminal device when it is determined that the terminal device and the reserved vehicle is present within a predetermined range around the location at which the user is to get in the reserved vehicle.

6. The reserved vehicle control system according to claim 3, wherein the computer turns on the light-emitting device mounted at a position corresponding to a direction of the terminal device.

7. The reserved vehicle control system according to claim 3, wherein the computer is configured to:

determine whether the distance between the terminal device and the reserved vehicle is a predetermined value or less than the predetermined value in accordance with the positional information of the terminal device and the positional information of the reserved vehicle; and inhibit the allowing information from being output to the terminal device when determining that the distance between the terminal device and the reserved vehicle is the predetermined value or less than the predetermined value.

8. The reserved vehicle control system according to claim 3, wherein the computer is configured to:

acquire map information;

determine whether there is a construction obstructing a field of vision of the user between the terminal device and the reserved vehicle, in accordance with the positional information of the terminal device, the positional information of the reserved vehicle, and the map information.

* * * * *